United States Patent
Tellado et al.

(10) Patent No.: US 12,101,643 B2
(45) Date of Patent: *Sep. 24, 2024

(54) ASSISTED NETWORK ROAMING WITH PREDICTIVE NETWORK TOOL

(71) Applicant: HEWLETT PACKARD ENTERPRISE DEVELOPMENT LP, Houston, TX (US)

(72) Inventors: Jose Tellado, Santa Clara, CA (US); Bernd Bandemer, Santa Clara, CA (US); Sachin N. Ganu, San Jose, CA (US); Sai Pradeep Venkatraman, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/530,828

(22) Filed: Nov. 19, 2021

(65) Prior Publication Data

US 2022/0078632 A1    Mar. 10, 2022

Related U.S. Application Data

(63) Continuation of application No. 16/219,334, filed on Dec. 13, 2018, now Pat. No. 11,206,550.

(51) Int. Cl.
*H04W 16/22* (2009.01)
*H04W 36/00* (2009.01)
(Continued)

(52) U.S. Cl.
CPC ..... *H04W 16/225* (2013.01); *H04W 36/0085* (2018.08); *H04W 36/14* (2013.01);
(Continued)

(58) Field of Classification Search
CPC ........... H04W 16/225; H04W 36/0085; H04W 36/14; H04W 36/18; H04W 36/26;
(Continued)

(56) References Cited

U.S. PATENT DOCUMENTS

| 8,089,939 B1 * | 1/2012 | Mater | H04W 36/30 370/332 |
|---|---|---|---|
| 9,019,938 B2 | 4/2015 | Liu et al. | |

(Continued)

OTHER PUBLICATIONS

Cisco, "Chapter 11: 802.11r, 802.11k, 802.11v, 802.11w Fast Transition," Enterprise Mobility 8.1 Design Guide, retrieved online Sep. 5, 2018, https://www.cisco.com/c/en/us/td/docs/wireless/controller/8-1/Enterprise-Mobility-8-1-Design-Guide/Enterprise_Mobility_8-1_Deployment_Guide/Chapter-11.html.

(Continued)

*Primary Examiner* — Chirag G Shah
*Assistant Examiner* — Joshua Smith
(74) *Attorney, Agent, or Firm* — Hewlett Packard Enterprise Patent Department (57) ABSTRACT

A method for identifying a client device in a network, and a first radio in the network that is coupled with the client device is provided. The method includes determining one or more sequences of roaming events for multiple client devices in the network, evaluating a performance metric for a roaming event and evaluating an interaction between the client device and one or more radios involved in the roaming events for the plurality of client devices. The method also includes selecting a second radio in the network based at least in part on (1) the one or more sequences of roaming events, (2) the performance metric, and (3) the interaction between the client device and the one or more radios, and recommending switching the client device from the first radio to the second radio. A system and a predictive tool to perform the above method are also provided.

21 Claims, 7 Drawing Sheets

(51) Int. Cl.
*H04W 36/14* (2009.01)
*H04W 36/18* (2009.01)
*H04W 36/26* (2009.01)
*H04W 36/32* (2009.01)
*H04W 40/18* (2009.01)

(52) U.S. Cl.
CPC .......... *H04W 36/18* (2013.01); *H04W 36/26* (2013.01); *H04W 36/32* (2013.01); *H04W 40/18* (2013.01)

(58) Field of Classification Search
CPC ... H04W 36/32; H04W 40/18; H04W 36/245; H04W 8/18; H04W 36/36; H04W 84/12
See application file for complete search history.

(56) References Cited

U.S. PATENT DOCUMENTS

| | | | |
|---|---|---|---|
| 9,591,497 | B2 | 3/2017 | Mannemala et al. |
| 11,206,550 | B2 * | 12/2021 | Tellado ............... H04W 36/245 |
| 2005/0025181 | A1 * | 2/2005 | Nazari ................. H04W 88/06 |
| | | | 370/469 |
| 2005/0096051 | A1 * | 5/2005 | Lee ................... H04W 36/0058 |
| | | | 455/438 |
| 2007/0275701 | A1 * | 11/2007 | Jonker ................. H04W 48/16 |
| | | | 455/414.1 |
| 2008/0076434 | A1 * | 3/2008 | Shigaki ................ H04W 36/08 |
| | | | 455/442 |
| 2008/0107082 | A1 | 5/2008 | Igarashi et al. |
| 2011/0053596 | A1 | 3/2011 | Wohlert et al. |
| 2012/0008593 | A1 * | 1/2012 | Randriamasy ........ H04W 36/32 |
| | | | 370/331 |
| 2012/0008596 | A1 * | 1/2012 | Jung ................. H04W 36/0033 |
| | | | 370/331 |
| 2012/0142355 | A1 | 6/2012 | Jha |
| 2012/0264436 | A1 | 10/2012 | Fujito |
| 2013/0023281 | A1 | 1/2013 | Meredith et al. |
| 2013/0029708 | A1 | 1/2013 | Fox et al. |
| 2013/0040682 | A1 * | 2/2013 | Chang ................... H04W 36/32 |
| | | | 455/517 |
| 2014/0073303 | A1 | 3/2014 | Henderson et al. |
| 2014/0370817 | A1 * | 12/2014 | Luna .................... H04W 8/005 |
| | | | 455/41.3 |
| 2015/0094069 | A1 * | 4/2015 | Gopal ............. H04W 36/00835 |
| | | | 455/437 |
| 2015/0098387 | A1 * | 4/2015 | Garg ................. H04W 36/0085 |
| | | | 370/328 |
| 2015/0146689 | A1 * | 5/2015 | Fu ........................ H04W 36/023 |
| | | | 370/331 |
| 2016/0135104 | A1 | 5/2016 | Lau et al. |
| 2017/0094574 | A1 | 3/2017 | Singh et al. |
| 2017/0311216 | A1 * | 10/2017 | Mythri Hunukumbure ................ H04W 36/0009 |
| 2018/0020432 | A1 * | 1/2018 | Rico Alvarino .. H04W 72/0453 |
| 2018/0295548 | A1 * | 10/2018 | Kumar ............. H04W 36/0083 |

OTHER PUBLICATIONS

Papadopouli, M. et al., "Modeling Client Arrivals at Access Points in Wireless Campus-wide Networks," Sep. 18, 2005, IEEE, https://projects.ics.forth.gr/tech-reports/2005/2005.TR357_Modeling_clients_arrivals_wireless_campus-wide_networks.pdf.

* cited by examiner

ASSISTED NETWORK ROAMING WITH PREDICTIVE NETWORK TOOL

CROSS REFERENCE TO RELATED APPLICATIONS

This application is a continuation of, and claims the priority benefit of U.S. patent application Ser. No. 16/219,334, filed on Dec. 13, 2018, issued as U.S. Pat. No. 11,206,550 the contents of which are incorporated herein by reference in their entirety.

BACKGROUND

Background

In a wireless local area network (WLAN), client devices (e.g., mobile devices such as mobile phones and the like) roaming from one access point (AP) to another have control over which AP to pick for continued connectivity to the network. With limited resources and data about the network available to the client device, such determination of a preferred AP may not be the most beneficial for the client device, or the network. Further, the limited processing capabilities of the client device may cause undesirable lags, connectivity gaps, or drops.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

In many WLAN applications, roaming client devices (e.g., mobile phones and the like) determine suitable APs for network connectivity by actively probing (or passively listening to) multiple APs and choosing the one that has the strongest response signal (e.g., as measured by a metric such as signal-to-noise ratio). Such active or passive scanning processes take time and resources from the client device, thereby limiting its effectivity and leading to failure during low bandwidth situations.

Embodiments as disclosed herein solve the above problem by finding a suitable AP for the client device based on historical connectivity data collected for the specific client device and/or for other, similar client devices. In addition, some embodiments include a predictive tool that enables a network controller to predict future behavior of the user associated with the client device (e.g., most likely direction of travel, and location presence). Thus, embodiments as disclosed herein may identify the best, or one of the best suited APs for a roaming client device.

A network controller as disclosed herein is configured to monitor client devices roaming in a WLAN. Further, the network controller may identify the client device with a user profile stored in a database, or may determine that the characteristics of the client device are similar to those of a client device corresponding to a user profile in the database. The user profile may include user connectivity trends over extended periods of time, and other usage connectivity patterns for each of multiple client devices such as the amount of time a user remains connected to a network. In some embodiments the user profile includes the type and identification of the client device including the model, manufacturer, operating system, and other resources available to the client device.

Embodiments as disclosed herein include methods for providing to a client device in a WLAN a list of preferred access points, e.g., radios, or basic service set (BSS) device having an identification (BSSID) within the AP, to maintain/continue network connectivity. The client device may then select from the list one access point to connect to. The list of access points may also indicate a first or a second radio (or more) handled by the access point and that is recommended to link to. Moreover, in some embodiments the list includes a recommendation for the client device to switch from a public network to a secure network, based on a BSSID detected for the client device.

The present disclosure addresses the problem arising in computer technology of handling a smooth and seamless roaming environment for WLANs. The proposed solution includes the use of a predictive tool in a network controller that provides a list of preferred access points to the client devices. The list of preferred access points is determined based on a client device history accumulating data for multiple client devices handled by the WLAN.

In one embodiment of the present disclosure, a computer-implemented method is described that includes identifying, with a network controller, a client device in a network, and a first radio of a first network device in the network that is communicatively coupled with the client device. The computer-implemented method also includes determining one or more sequences of roaming events for a plurality of client devices in the network, wherein at least one sequence of roaming events associated with each client device in the plurality of client devices includes the first radio and evaluating a performance metric for at least one roaming event in at least one sequence of the roaming events. The computer-implemented method also includes evaluating an interaction between the client device and one or more radios involved in the one or more sequences of roaming events for the plurality of client devices, and selecting a second radio of a second network device in the network based at least in part on (1) the one or more sequences of roaming events, (2) the performance metric, and (3) the interaction between the client device and the one or more radios. The computer-implemented method also includes recommending switching from the first radio of the first network device to the second radio of the second network device to the client device.

According to one embodiment, a system is described that includes a memory storing instructions and one or more processors configured to execute the instructions to identify, with a network controller, a client device in a network, and a first radio of a first network device in the network that is communicatively coupled with the client device. The one or more processors are further configured to determine one or more sequences of roaming events for a plurality of client devices in the network, wherein at least one sequence of roaming events associated with each client device in the plurality of client devices includes the first radio, to evaluate a performance metric for at least one roaming event in at least one sequence of roaming events, and to evaluate an interaction between the client device and one or more radios involved in the one or more sequences of roaming events for the plurality of client devices. The one or more processors are further configured to select a second radio of a second network device in the network based at least in part on (1) the one or more sequences of roaming events, (2) the performance metric, and (3) the interaction between the client device and the one or more radios. The one or more processors are further configured to recommend switching from the first radio of the first network device to the second radio of the second network device to the client device.

According to one embodiment, a non-transitory, machine-readable medium is described that includes instructions, which when executed by one or more processors, cause a computer to perform a method, the method includes identifying, with a network controller, a client device in a network, and a first radio of a first network device in the network that is communicatively coupled with the client device. The method also includes determining one or more sequences of roaming events for a plurality of client devices in the network, wherein at least one sequence of roaming events associated with each client device in the plurality of client devices includes the first radio, and evaluating a performance metric for at least one roaming event in at least one sequence of the roaming events, and evaluating an interaction between the client device and one or more radios involved in the one or more sequences of roaming events for the plurality of client devices. The method also includes selecting a second radio of a second network device in the network based at least in part on (1) the one or more sequences of roaming events, (2) the performance metric, and (3) the interaction between the client device and the one or more radios. The method also includes recommending switching from the first radio of the first network device to the second radio of the second network device to the client device.

In yet other embodiment, a system is described that includes a means for storing commands and a means for executing the commands causing the system to perform a method that includes identifying, with a network controller, a client device in a network, and a first radio of a first network device in the network that is communicatively coupled with the client device, and determining one or more sequences of roaming events for a plurality of client devices in the network, wherein at least one sequence of roaming events associated with each client device in the plurality of client devices includes the first radio. The method also includes evaluating a performance metric for at least one roaming event in at least one sequence of roaming events, evaluating an interaction between the client device and one or more radios involved in the one or more sequences of roaming events for the plurality of client devices. The method also includes selecting a second radio of a second network device in the network based at least in part on (1) the one or more sequences of roaming events, (2) the performance metric, and (3) the interaction between the client device and the one or more radios, and recommending switching from the first radio of the first network device to the second radio of the second network device to the client device.

In one embodiment, a computer-implemented method as disclosed herein includes identifying, with a network controller, one or more sequences of roaming events for multiple client devices in a wireless network. The computer-implemented method also includes associating at least one roaming event with an initial radio and a target radio in the wireless network, with a type of a client device involved in the roaming event, and a success metric for the roaming event, and identifying, for the client device involved in the roaming event, a communication history in the wireless network. The computer-implemented method also includes determining a quality of service for the client devices with multiple radios in the wireless network, the radios including the initial radio and the target radio and forming a predictive tool with the communication history and with the quality of service for the client devices.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Example System Architecture

Figure 1:
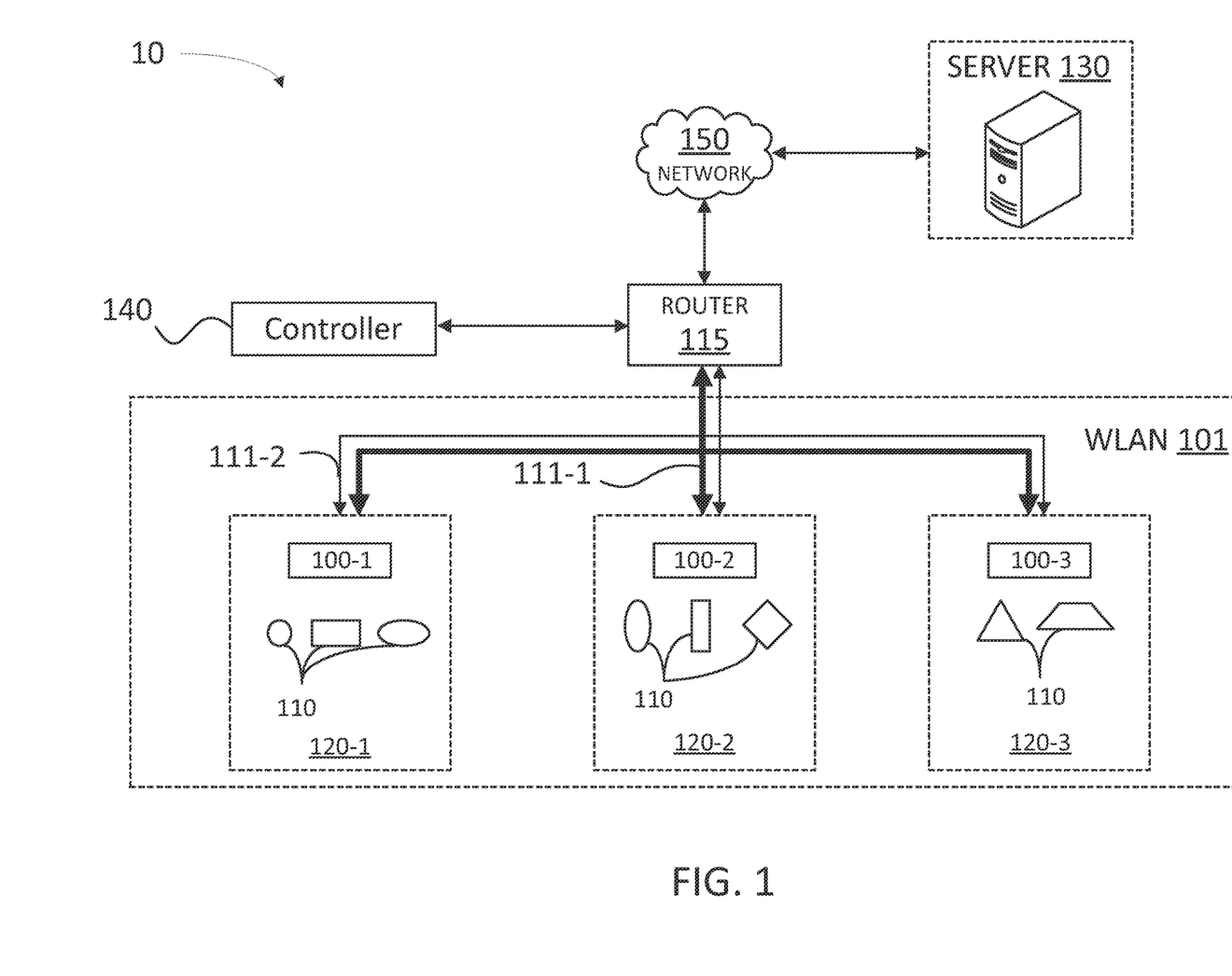
FIG. 1 illustrates a deployment of a wireless local area network including multiple access points for roaming client devices, according to some embodiments.

FIG. 1 illustrates a deployment 10 of a WLAN 101 including multiple network devices 100-1, 100-2, and 100-3 (hereinafter, collectively referred to as "network devices 100"), according to some embodiments. Deployment 10 includes a server 130, a router 115, network devices 100, and client devices 110 connected over a network 150. In some embodiments, network devices 100 host client devices 110 in WLAN 101. In general, each of network devices 100 may define a location 120-1 within which client devices 110 are serviced. Locations 120-1 may be selected based on a signal strength between network device 100 and client device 110. Furthermore, network devices 100 may include an AP or an instant AP (LAP) for WLAN 101. Server 130, network devices 100, and client device 110 are configured to host memory circuits including instructions which, when executed by one or more processors cause server 130, network devices 100, and client device 110 to perform at least some of the steps in methods as disclosed herein. In some embodiments, a processor in client device 110 is configured to perform an application stored in a memory of client device 110.

Client device 110 may include a laptop, or a mobile device, a smart phone, a tablet, or any other portable computing device capable to wirelessly communicate with server 130 through network 150 and with network devices 100 through WLAN 101. For example, when WLAN 101 is a company network hosted by server 130, client device 110 may be an "employee owned," or a "bring your own device" (BYOD) type device. In that regard, client devices 110 may be communicatively coupled with WLAN 101 on a secure network 111-1, or in a public network 111-2. Controller 140 may determine whether a client device 110 belongs in secure network 111-1, or in public network 111-2 based on the authentication credentials of client device 10 retrieved from a service set identifier (SSID) received from mobile device 110. For example, secure network 111-1 may include an enterprise network associated with server 130 hosting WLAN 101 and assigned for employee use-only, with encrypted security. Public network 111-2 may include a guest network for a visitor or some other non-affiliated user roaming in WLAN 101.

Network devices 100 may be any device used to handle data communication in WLAN 101, e.g., anode, a switch, a multiplexer, a router, or an access point (AP). In that regard, network devices 100 may include any one of a wired terminal (e.g., a copper cable, a fiber optic cable), or a wireless and/or Internet of Things (IoT) terminal (e.g., Wi-Fi, Bluetooth, Zigbee, cellular network, and the like), or any combination thereof. Accordingly, network devices 100 may be communicatively coupled with server 130 through network 150, and with client devices 110 (e.g., a mobile phone, a smart phone, a tablet) through WLAN 101. In that regard, network devices 100 may include instant access points (IAPs) that can act as virtual controllers, routers, hubs, network switches, wireless controllers, and the like, and WLAN 101 may be installed in retail a store, a businesses (e.g., restaurants, shopping malls, and the like), a factory, an office building, and the like. Moreover, different network devices 100 may have different configuration settings in terms of requirements and capabilities, access and privileges, based on the specification of WLAN 101, and intended purpose.

Network 150 can include, for example, any one or more of a LAN (LAN), a wide area network (WAN), the Internet, and the like. Further, network 150 and WLAN 101 can include, but are not limited to, any one or more of the following network topologies, including a bus network, a star network, a ring network, a mesh network, a star-bus network, tree or hierarchical network, and the like.

Figure 2:
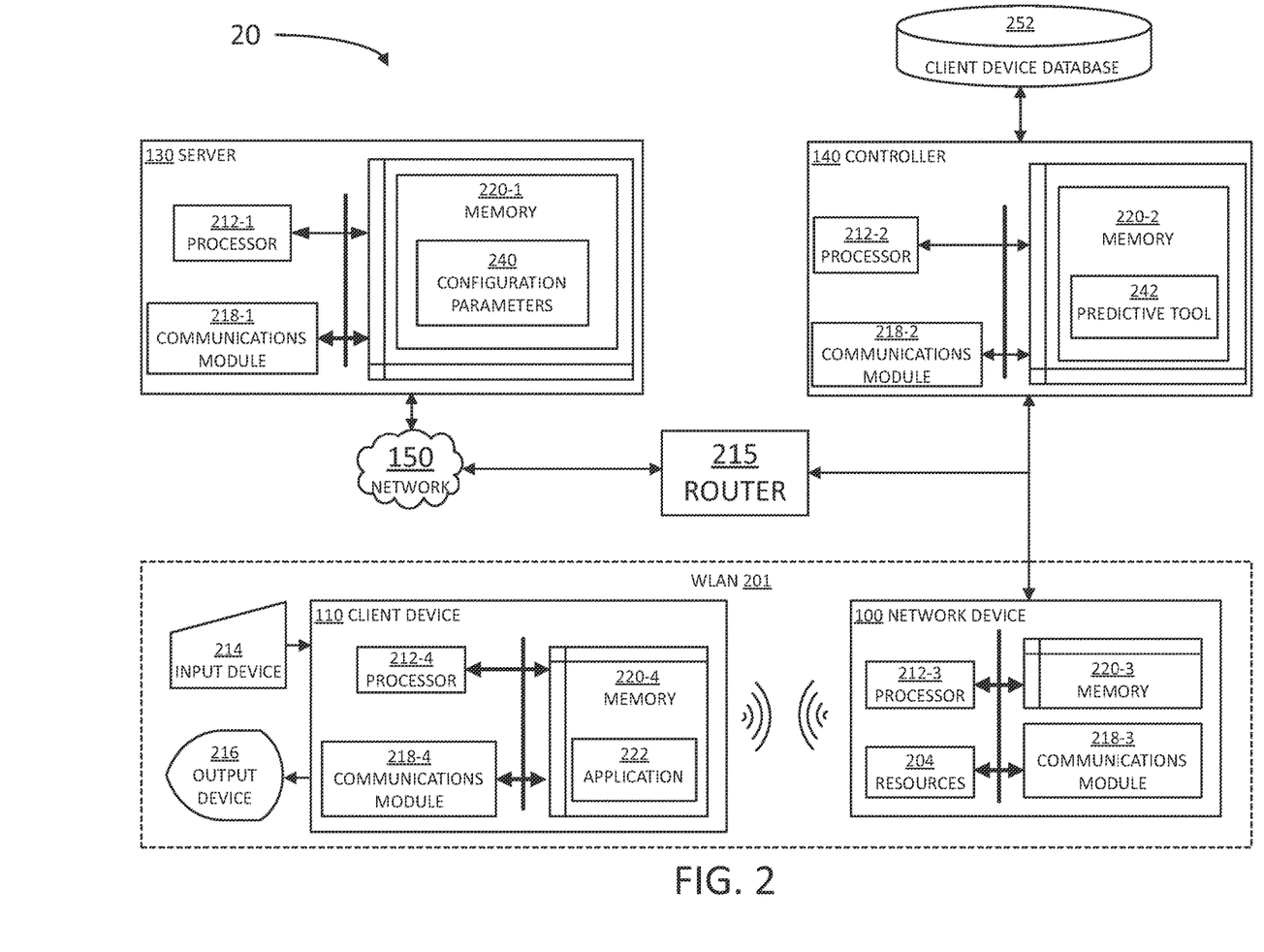
FIG. 2 is an architecture illustrating an example network device and client device communicatively coupled via a WLAN hosted by a remote server, according to certain aspects of the disclosure.

FIG. 2 is an architecture 20 illustrating an example network device 100 and client device 110 communicatively coupled via a WLAN 201 hosted by server 130, according to certain aspects of the disclosure. Controller 140 has access to network device 100, and a router 215 directs network traffic between server 130 and WLAN 201. For illustrative purposes only, and without limitation, only one WLAN 201 and only one client device 110 communicating with one network device 100 are shown in the figure. Network device 100 includes a processor 212-3 and a memory 220-3 storing instructions to be executed by processor 212-3, and other data (e.g., installation configuration scripts provided by server 130) to cause network device 100 to perform at least partially some of the steps in methods as disclosed herein. Client device 110 may be coupled with an input device 214 and an output device 216. Input device 214 may include a mouse, a keyboard, a touchscreen, and the like. Output device 216 may include a display, a touchscreen, a microphone, and the like. In some embodiments, input device 214 and output device 216 may be included in the same unit (e.g., a touchscreen).

Server 130 is communicatively coupled with controller 140, with network device 100 and with client device 110, over network 150, via communications modules 218-1, 218-2, 218-3 and 218-4 (hereinafter, collectively referred to as "communications modules 218"), respectively. Moreover, network device 100 and client device 110 may be communicatively coupled with each other through communications modules 218-3 and 218-4, in WLAN 201, hosted by server 130. In that regard, network devices 100 may include an AP or an IAP hosted by server 130 and servicing WLAN 201. Communications modules 218 are configured to interface with network 150 to send and receive information, such as data packets, requests, responses, and commands to other devices on network 150 or WLAN 201. Communications modules 218 can be, for example, modems or Ethernet cards.

Communication modules 218-3 and 218-4 may include a wireless communication antenna configured to operate at multiple radio frequencies. For example, communications modules 218-3 and 218-4 may include a first radio operating in a 2.4 GHz band, and a second radio operating in the 5 GHz band. In some embodiments, network device 100 also includes resources 204 to handle wireless communications through multiple radios in communications module 218-3. For example, resources 204 may include radios and protocols such as Wi-Fi, Bluetooth and the like. Resources 204 may include hardware and software components, such as radio-frequency (RF) antennas and controller circuits to scan WLAN 201 for client devices 110 present therein (e.g., using a BLE radio), and the like. Further, some resources 204 in network device 100 may be configured to track a location of client device 110 via a tracking application (e.g., application 222), installed in client device 110 with the knowledge and permission by the user of client device 110.

In server 130, processor 212-1 is configured to execute instructions, such as instructions physically coded into processor 212-1, instructions stored in memory 220-1, or a combination of both. Client device 110 also includes a memory 220-4 storing instructions to be executed by processor 212-4, such as application 222. In some embodiments, application 222 may be installed in client device 110 by server 130 (or a proxy, such as network device 100) and perform scripts and other routines provided by server 130.

In controller 140, memory 220-2 includes a predictive tool 242 configured to predict the roaming behavior of client device 110 within WLAN 201. In some embodiments, predictive tool 242 has full access to a client device database 252. Client device database 252 stores client device historical data from multiple client devices 110 that have interacted with WLAN 201. Accordingly, client device database 252 includes client device histories including client device identification and other information associated with a given client device 110 (e.g., model, manufacturer, operating system, and the like). Furthermore, client device database 252 may also include an indication of a type of device associated with the client device. For example, in some embodiments, client device database 252 may indicate that a certain device is a laptop, or is a BYOD, or a user's personal smart phone. A client device history in client device database 252 may also include a list of network devices 100 that interacted with client device 110, and even a trajectory of client device 110 within WLAN 201. In some embodiments, the client device history may further include the times and length periods for which client device 110 interacted with network device 100. Predictive tool 242 may apply machine-learning algorithms (e.g., neural networks, artificial intelligence, and the like), to build multiple user profiles that are stored in client device database 252. In some embodiments, predictive tool 242 may include other nonlinear regression algorithms, such as a Markov chain, and the like. A user profile includes the type of client device used by a user to log into WLAN 201, the network device addressed (e.g., input access points), and the period of time that the connectivity lasted, patterns of connectivity, and the like. Client device database 252 may include a lookup table associating identification codes for a client device with multiple connectivity mode credentials of client device 110 for WLAN 201 (e.g., SSID and the like).

In some embodiments, controller 140 may push at least some commands and instructions from predictive tool 242 to the network edge (e.g., WLAN 201). More specifically, in some embodiments, network device 100 may include at least one AP acting as a virtual controller in WLAN 201 to provide a real time recommendation to client device 110 as to accessing one or more APs in WLAN 201.

Hereinafter, processors 212-1, 212-2, 212-3, and 212-4 will be collectively referred to as "processors 212." Likewise, memory circuits 220-1, 220-2, 220-3, and 220-4 will be collectively referred to as "memory circuits 220."

Configuration parameters block 240 includes a list of settings and scripts with configuration settings and communication protocols for multiple connectivity modes between client device 110 and WLAN 201. Accordingly, when client device 110 is de-configured, or at least one connectivity mode in client device 110 is disabled, erased, or reset (e.g., by error, damage, or a malicious attack), server 130 may provide a fresh copy of the missing configuration script to client device 110 from configuration parameters 240, directly through network 150, or through network devices 100 and WLAN 201.

Figure 3:
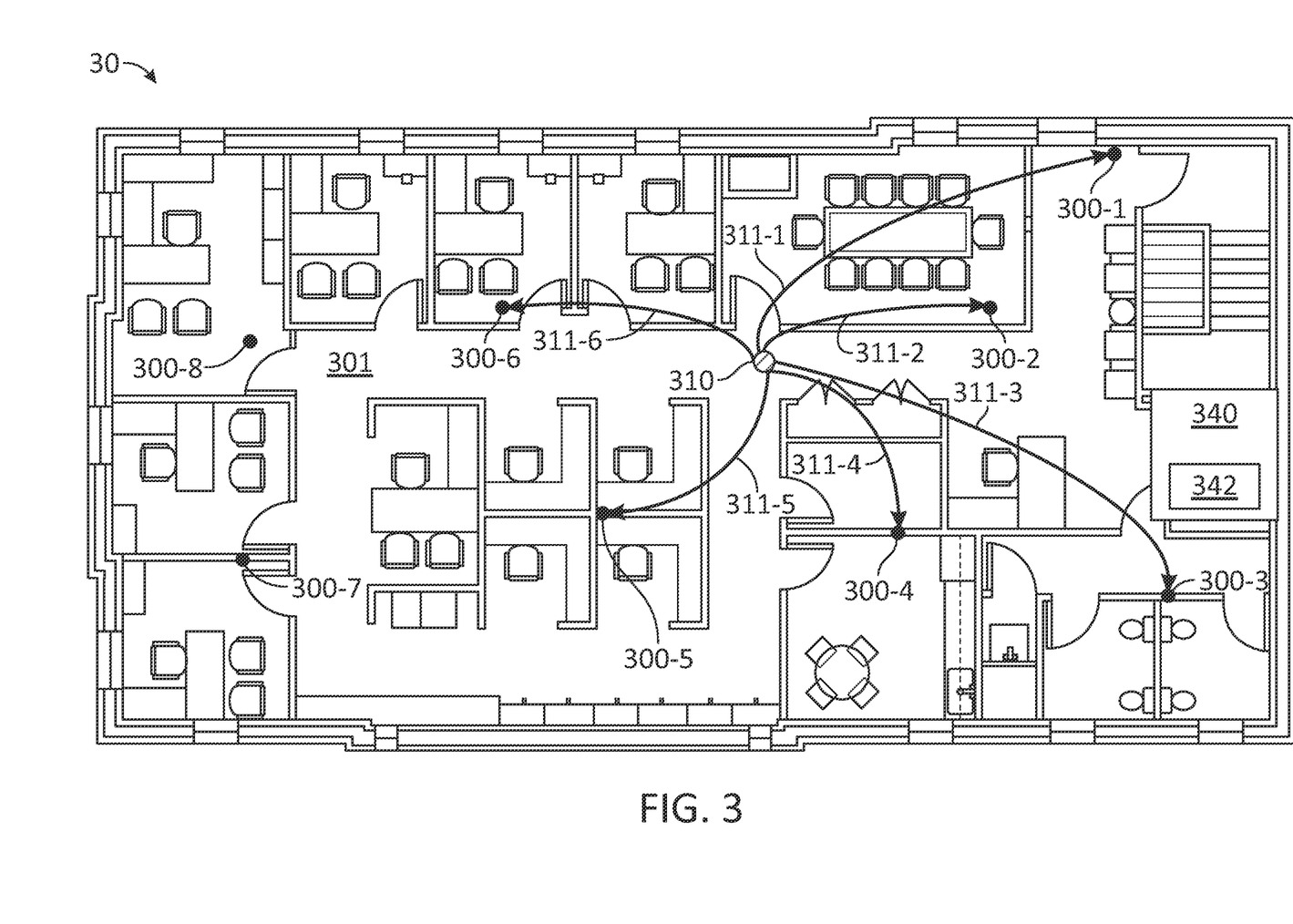
FIG. 3 illustrates a network roaming in a wireless local area network assisted with a predictive tool, according to some embodiments.

FIG. 3 illustrates a network roaming in a wireless local area network 301 assisted with a predictive tool 342, according to some embodiments. A WLAN 301 having access points 300-1, 300-2, 300-3, 300-4, 300-5, 300-6, 300-7, and 300-8 (hereinafter, collectively referred to as "access points 300") is deployed over a floor plan 30. Access points 300 in WLAN 301 are controlled by controller 340, which includes a predictive tool 342 (e.g., controllers 140 and 240 and predictive tool 242). Each of access points 300 may have a radius of operation of 20-40 ft., or even less. A client device 310 is roaming in an office having floor plan 30. Controller 340 detects and identifies client device 310, and the current access point linking to it (e.g., access point 300-5). Controller 340 also detects the radio used by access point 300-5 to communicate with client device 310 (e.g. a first radio at a 2.4 GHz band, a second radio at a 5 GHz band, a Bluetooth radio, Wi-Fi, and the like). Controller 340 further detects whether client device 310 is in a secure network (e.g. secure network 111-1) or in a public network (e.g., public network 111-2), based on an SSID associated with mobile device 310.

WLAN 301 is a Wifi-environment including a specific signal propagation configuration (e.g., buildings, furniture, architectural elements such as stair cases, windows, metal cabinets, elevator shafts, and the like). The Wi-Fi environment for WLAN 301 is also determined by network capabilities (e.g., APs 300), density of APs 300. Moreover, while WLAN 301 is shown as an indoor environment, in some embodiments WLAN 301 may include an outdoor setting with specific conditions that may be permanent (buildings), semi-permanent, or variable (e.g., vehicle traffic, airline traffic, and the like).

Predictive tool 342 determines a preference rate (e.g., likelihood or probability) 311-1 that client device 310 be coupled through access point 300-1 based on a client device history. The client device history may be stored in a client device database (e.g., client device database 252), and may be associated with client device 310, or with a client device that is similar to client device 310. Likewise, predictive tool 342 also determines a preference rate 311-2 that client device 310 be coupled through access point 300-2 and a preference rate 311-3 that client device 310 be coupled through access point 300-3. Further, predictive tool 342 may determine a preference rate 311-4 that client device 310 be coupled through access point 300-4, a preference rate 311-5 that client device 310 be coupled through access point 300-5, and a preference rate 311-6 that client device 310 be coupled through access point 300-6. Preference rates 311-1, 311-2, 311-3, 311-4, 311-5, and 311-6 will be collectively referred to, hereinafter, as "preference rates 311"

Accordingly, controller 340 may provide the following list of APs 300 to client device 310 to maintain/improve connectivity with WLAN 301. The list may be sorted according the values of preference rates 311, as illustrated in Table 1.

TABLE 1

| BSSID | Preference Rate |
|-------|-----------------|
| 300-2 | 311-2 (28%)     |
| 300-4 | 311-4 (14%)     |
| 300-3 | 311-3 (12%)     |
| 300-5 | 311-5 (10%)     |
| 300-6 | 311-6 (8%)      |
| 300-1 | 311-1 (5%)      |

Controller 340 provide the list in Table 1 to client device 310 for connectivity to WLAN 301. Client device 310 decides which AP to choose for connectivity. For example, based on Table 1, client device 310 may switch connectivity from a first radio in access point 300-5 to a second radio in access point 300-2. In that regard, the list provided by controller 340 to client device 310 may also include a radio device that is desirably used in the communication with WLAN 301. Accordingly, the same access point 300 may appear twice or more in the list (cf. Table 1), each listing associated with one of the multiple radios available in access point 300 (e.g., a first radio in the 2.4 GHz band, and a second radio in the 5 GHz band).

In some embodiments (e.g., when a new AP 300 is installed in WLAN 301) controller 340 may use a return signal strength indicator (RSSI) between the new AP and surrounding APs to determine whether the new AP 300 should be included in Table 1.

Moreover, in some embodiments the list provided by controller 340 to client device 310 may include a network to use for WLAN 301 (e.g., a secure network or a public network). For example, in some embodiments controller 340 may detect an SSID that authorizes client device 310 to use a secure network, rather than a public network. Instances like this may occur when an employee having a mobile device (e.g., BYOD) inadvertently enters floor plan 30 and WLAN 301 automatically assigns to the BYOD a public network through access point 300-5. Accordingly, controller 340 may recognize the BYOD as linked to an employee who has appropriate credentials and is authorized to access the secure network in WLAN 301. Thus, controller 340 may move access point 300-5 with a secure network credential up in the list of Table 1.

In some embodiments, controller 340 provides Table 1 sorted according to a performance metric of the connectivity of client device 310 with each of APs 300. The performance metric may include factors such as a quality of service, including a signal-to-noise ratio for the signal between client device 310 an each of APs 300. The performance metric may also include the speed of the link between client device 310 and each of the APs 300, a latency speed, and a bit-error-rate (BER) of the link between client device 310 and each of the APs 300.

Figure 4:
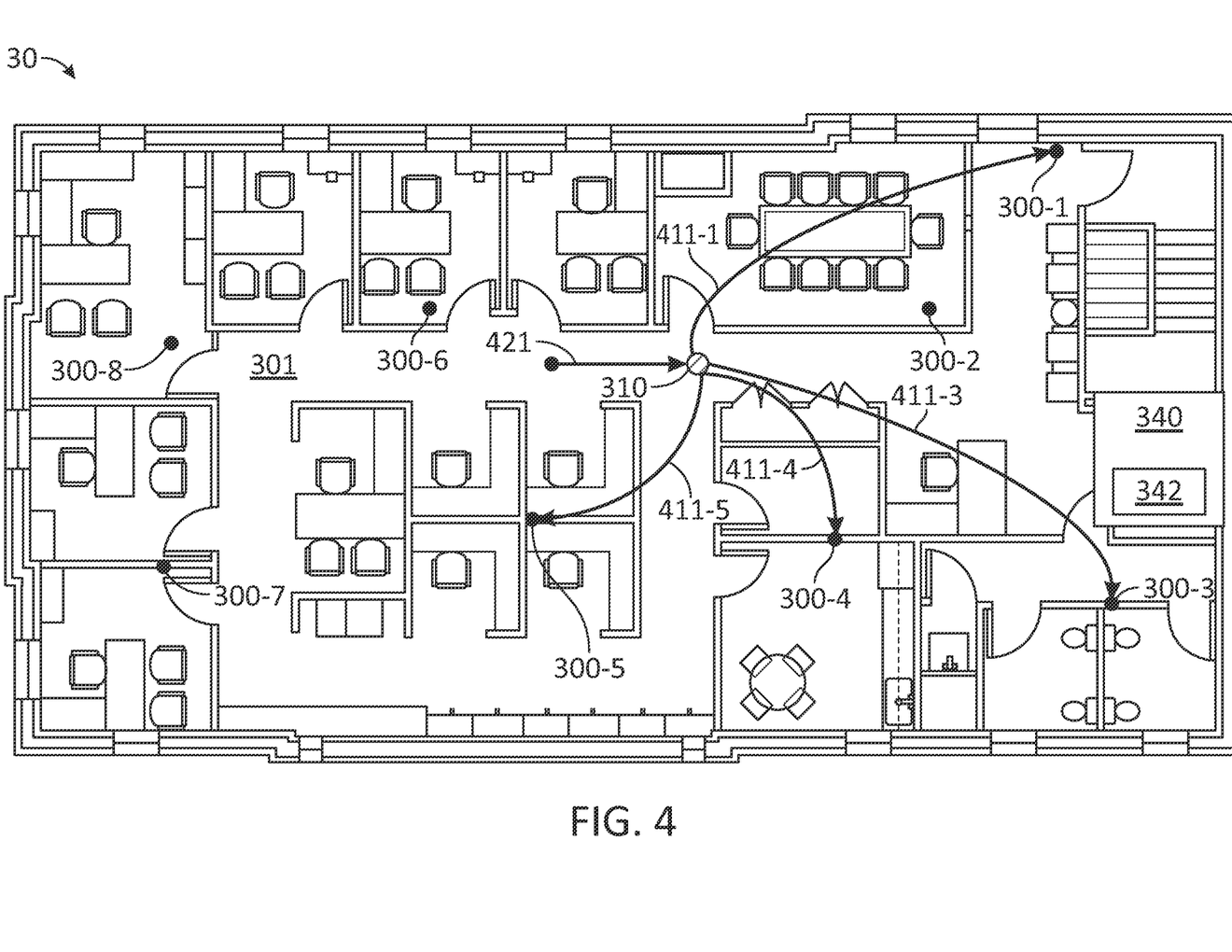
FIG. 4 illustrates a network roaming in a wireless local area network assisted with a predictive tool including localization data, according to some embodiments.

FIG. 4 illustrates a network roaming in WLAN 301 with predictive tool 342 including localization data 421, according to some embodiments. Localization data 421 may indicate a latest displacement of client device 310 prior to the current configuration. Localization data 421 may be provided to controller 340 by an application running in client device 310 (e.g., application 222) configured to track client device 310 as it roams within WLAN 301. In some embodiments, localization data 421 may be provided by different access points 300 that have recently handled client device 310 as it roams within WLAN 301. Moreover, in some embodiments localization data 421 is a velocity vector indicating speed and direction of motion of client device 310 through WLAN 301. The velocity vector may be determined from RSSI or round-trip time (RTT) signals from client device 310 and collected by one or more of APs 300.

With the addition of localization data 421, the preference rates 411-1, 411-3, 411-4, and 411-5 (hereinafter, collectively referred to as "preference rates 411") determined by predictive tool 342 may be altered, as follows:

TABLE 2

| BSSID | Preference Rate |
|---|---|
| 300-1 | 411-1 (80%) |
| 300-3 | 411-3 (14%) |
| 300-4 | 411-4 (3%) |
| 300-5 | 411-5 (1%) |

As shown in Table 2, controller 340 may determine that access point 300-1 is highly likely to be the preferred access point for client device 310 in the near future. This determination may be based on the direction of motion of client device 310. This determination may also be based on a client device history showing that most client devices along the same trajectory (e.g., starting from access point 300-5) follow course down the stairs in floor plan 30, close to access point 300-1.

In some embodiments, predictive tool 342 is also configured to determine a timing for providing a list of access points 300 to client device 310 (e.g., Table 1 or Table 2). For example, it may be desirable to provide the list in Table 2 to client device 310 well before the user reaches the stairs (as predicted by predictive tool 342). Providing Table 2 too far in advance of, or after, the user reaches the stairs in floor plan 30, may be undesirable, as access point 300-1 may no longer be the best-preferred access point at that moment.

Figure 5:
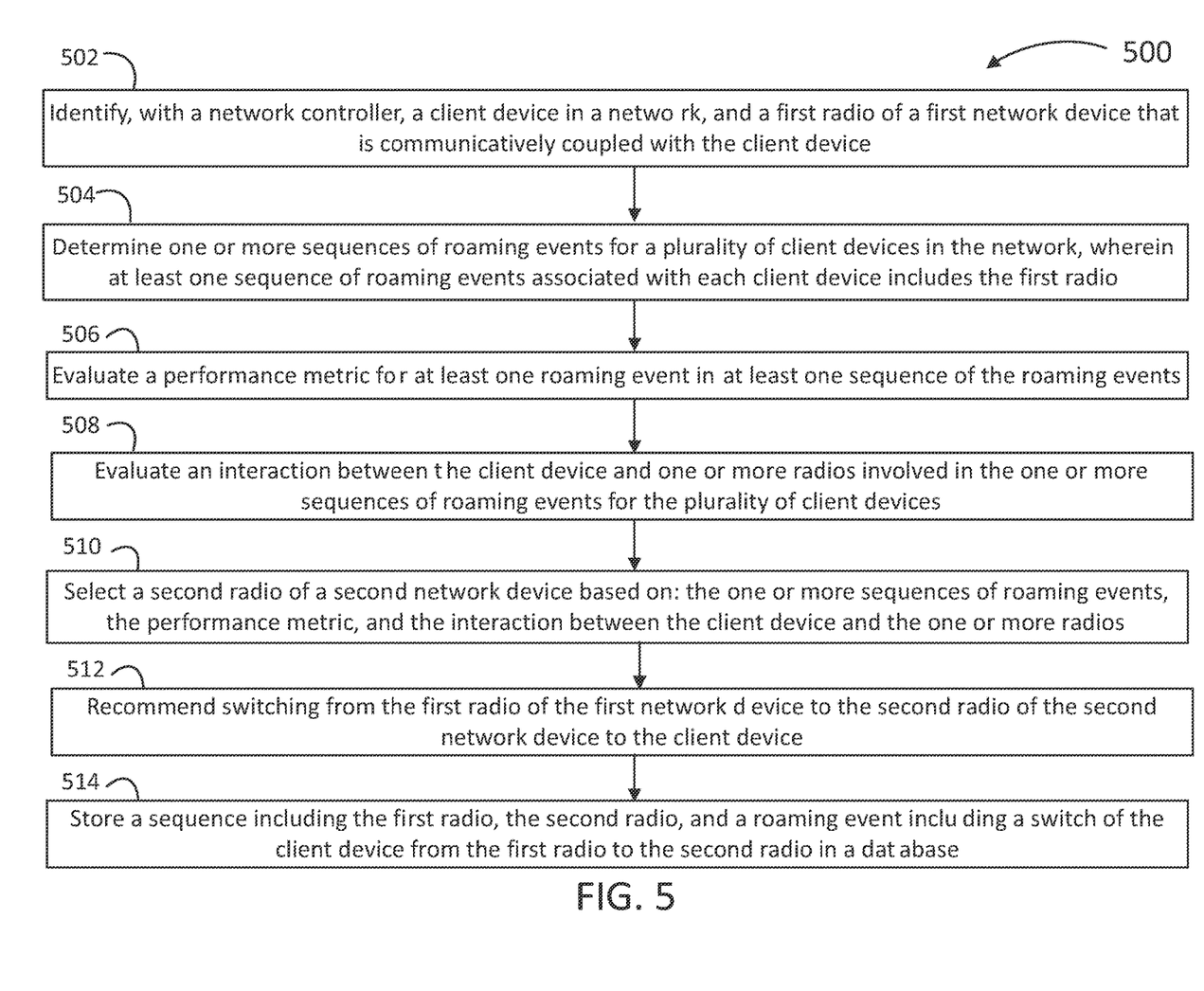
FIG. 5 is a flow chart illustrating steps in a method for assisting client device roaming in a wireless local area network, according to some embodiments.

FIG. 5 is a flowchart illustrating steps in a method 500 for assisting client device roaming in a wireless local area network, according to some embodiments. Method 500 may be performed at least partially by any one of a server, a controller, or a network device while communicating with a client device (e.g., any one of server 130, controllers 140 and 340, network devices 100, and client devices 110 or 310). The client device may be handled by a user, wherein the user may be a client of a wireless local area network (e.g., network 150, WLANs 101, 201 and 301). The server may be hosting a configuration parameters block to install and host at least a portion of an application installed in the client device, (e.g., configuration parameters block 240 and application 222). The controller may access traffic data from the network device, and use a predictive tool to find a preferred list of network devices that the client device may communicate with, to access the WLAN. At least some of the steps in method 500 may be performed by a computer having a processor executing commands stored in a memory of the computer (e.g., any one of processors 212 and memory circuits 220). Further, steps as disclosed in method 500 may include retrieving, editing, and/or storing files in a database that is part of, or is communicably coupled to, the computer, using, inter alia, the presence analysis engine. The database may include a client device database (e.g., client device database 252). Methods consistent with the present disclosure may include at least some, but not all, of the steps illustrated in method 500, performed in a different sequence. Furthermore, methods consistent with the present disclosure may include at least two or more steps as in method 500 performed overlapping in time, or almost simultaneously.

Step 502 includes identifying, with the network controller, a client device in the network, and a first radio of a first network device that is communicatively coupled with the client device. In some embodiments, step 502 includes identifying a manufacturer and a model of the client device, and a compatibility of the manufacturer and the model of the client device with the second radio.

Step 504 includes determining one or more sequences of roaming events for a plurality of client devices in the network, wherein at least one sequence of roaming events associated with each client device includes the first radio. In some embodiments, the one or more sequences of roaming events include interaction histories stored in the client device database. In some embodiments, the interaction history may include roaming events from multiple client devices. Further, in some embodiments the interaction history includes roaming events for the specific client device in the network. Accordingly, in some embodiments the network controller leverages the interaction histories of all other client devices versus the interaction history of the specific client device based on a similarity of the specific client device with at least some of the other client devices in the client device database. In some embodiments, the client device history includes a history of a second client device that is similar to the client device, and step 504 includes identifying the second client device. In some embodiments, step 504 includes retrieving the client device history from a client device database. In some embodiments, the first radio is provided by a first access point in the wireless network, and the second radio is provided by a second access point in the wireless network. Accordingly, in some embodiments step 504 includes predicting that the client device will move in a direction closer to the second access point. In some embodiments, step 504 includes identifying a wireless environment used by the client device and selecting the second radio based on a frequency of using the second radio in the wireless environment for multiple client devices in the wireless network. In some embodiments, step 504 includes identifying an application running in the client device, and wherein selecting the second radio includes identifying a resource utilization of the application running in the client device and a bandwidth of the second radio. In some embodiments, step 504 includes identifying a success metric of the second radio for communicating with a second client device similar to the client device.

Step 506 includes evaluating a performance metric for at least one roaming event in at least one sequence of the roaming events. In some embodiments, step 506 includes determining the quality of service for the client device based on a signal-to-noise ratio of a signal between the client device and the first radio.

Step 508 includes evaluating an interaction between the client device and one or more radios involved in the one or more sequences of roaming events for the plurality of client devices. In some embodiments, step 508 includes identifying a Wi-Fi environment in a vicinity of the client device and selecting the second radio based on a frequency of using the second radio in the Wi-Fi environment for multiple client devices in the network. In some embodiments, step 508 includes evaluating a rate of movement (speed and direction) of the client device relative to one or more APs in the vicinity.

Step 510 includes selecting a second radio of a second network device based on at least one of: (1) the one or more sequences of roaming events, (2) the performance metric, and (3) the interaction between the client device and the one or more radios. In some embodiments, step 510 includes predicting a second quality of service for the client device with the second radio based on the history of the client device. In some embodiments, step 510 includes recommending the second radio to the client device when the quality of service for the client device is higher with the second radio than with the first radio. In some embodiments, step 510 also includes determining a signal-to-noise ratio of the second signal between the client device and the second radio, and using the signal-to-noise ratio to predict the second quality of service. In some embodiments, step 510 includes determining the relevance of APs (e.g., APs that include the second radio) in the vicinity of the client device based on the speed and velocity of motion of the client device through the vicinity of APs. For example, in some embodiments step 510 may have a higher probability for selecting a radio in an AP located ahead of the direction of motion of the client device, relative to a radio in an AP located in the opposite direction.

Step 512 includes recommending switching from the first radio of the first network device to the second radio of the second network device to the client device. In some embodiments, step 512 further includes identifying an application running in the client device, and delaying or accelerating a steer of the client device from the first radio to the second radio based on the application running on the client device. In some embodiments, step 512 includes requesting a beacon report from the client device, and wherein recommending the second radio to the client device includes identifying a time window to recommend the second radio to the client device based on the beacon report. In some embodiments, step 512 further includes identifying an application running in the client device, and wherein to select the second radio the one or more processors are configured to identify a resource utilization of the application running in the client device and a bandwidth of the second radio.

Step 514 includes storing a sequence including the first radio, the second radio, and a roaming event including a switch of the client device from the first radio to the second radio in the database. In some embodiments, step 514 includes storing the second quality of service for the client device with the second radio with the history of the client device. In some embodiments, step 514 includes observing one or more sequences of roaming events for each of a plurality of client devices in the wireless network and monitoring a frequency of a success rate for switching between the first radio and the second radio. In some embodiments, step 514 includes determining the quality of service for the client device based on a signal-to-noise ratio of a signal between the client device and the first radio, and predicting a second quality of service for the client device with the second radio based on the client device history and on a signal-to-noise ratio of a second signal between the client device and the second radio. In some embodiments, step 514 includes storing a second quality of service for the client device with the second radio with the client device history. In some embodiments, step 514 includes identifying a similar configuration of a second client device in the wireless network, and switching a communication channel from a second client device from a third radio to the second radio based on a quality of service for the client device with the second radio.

Figure 6:
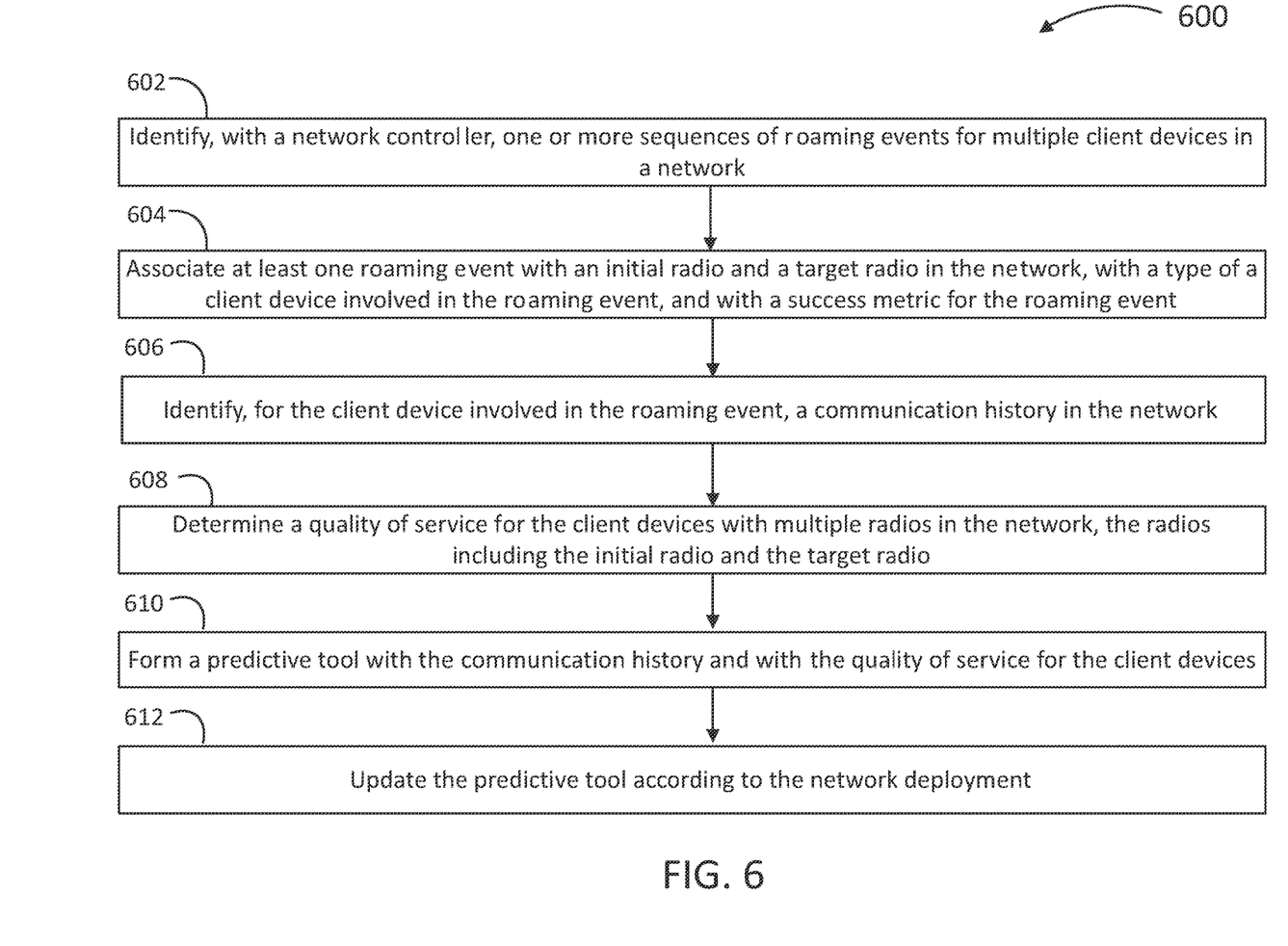
FIG. 6 is a flow chart illustrating steps in a method for creating a tool for making a predictive tool for assisted roaming in wireless local area networks, according to some embodiments.

FIG. 6 is a flow chart illustrating steps in a method 600 for creating a tool for making a predictive tool for assisted roaming in wireless local area networks, according to some embodiments. Method 600 may be performed at least partially by any one of a server, a controller, or a network device while communicating with a client device (e.g., any one of server 130, controllers 140 and 340, network devices 100, and client devices 110 or 310). The client device may be handled by a user, wherein the user may be a client of a wireless local area network (e.g., network 150, WLANs 101, 201 and 301). The server may be hosting a configuration parameters block to install and host at least a portion of an application installed in the client device, (e.g., configuration parameters block 240 and application 222). The controller may access traffic data from the network device, and use a predictive tool to find a preferred list of network devices that the client device may communicate with, to access the WLAN. At least some of the steps in method 600 may be performed by a computer having a processor executing commands stored in a memory of the computer (e.g., any one of processors 212 and memory circuits 220). Further, steps as disclosed in method 600 may include retrieving, editing, and/or storing files in a database that is part of, or is communicably coupled to, the computer, using, inter alia, the presence analysis engine. The database may include a client device database (e.g., client device database 252). Methods consistent with the present disclosure may include at least some, but not all, of the steps illustrated in method 600, performed in a different sequence. Furthermore, methods consistent with the present disclosure may include at least two or more steps as in method 600 performed overlapping in time, or almost simultaneously.

Step 602 includes identifying, with a network controller, one or more sequences of roaming events for multiple client devices in a network.

Step 604 includes associating at least one roaming event with an initial radio and a target radio in the network, with a type of client device involved in the roaming event, and with a success metric for the roaming event. A type of the client device may include a device manufacturer, a model number, an operating system installed in the client device, and further details in the specification of the given device: e.g., capabilities, processor speed, memory size, and the like.

Step 606 includes identifying, for the client device involved in the roaming event, a communication history in the network. In some embodiments, step 606 may include identifying the communication history in a client device database for a second client device that is similar to the client device.

Step 608 includes determining a quality of service for the client devices with multiple radios in the network, the radios including the initial radio and the target radio. In some embodiments, step 608 includes scanning at least the initial radio and the target radio for a signal-to-noise ratio with at least the client device involved in the roaming event.

Step 610 includes forming a predictive tool with the communication history and with the quality of service for the client devices. In some embodiments, the roaming event includes a switch of the client device from the initial radio to the target radio. Accordingly, in some embodiments step 610 includes weighting the roaming event according to a change in quality of service for the client device between the initial radio and the target radio. In some embodiments, step 610 includes adjusting the predictive tool to identify the target radio before a drop in a quality of service for the client device with the initial radio below a pre-selected threshold.

Step 612 includes updating the predictive tool according to the network deployment. In some embodiments, step 612 includes updating the predictive tool when the AP topology changes in the network (e.g., one or more Aps are arranged in a different spatial configuration). Other modifications in the network deployment, prompting step 612, may include installation and of new Aps, removal of existing Aps, or configuration upgrades of existing APs. In some embodiments, step 612 may include periodically reviewing connectivity records to scan for new Aps, or re-configured APs.

Hardware Overview

Figure 7:
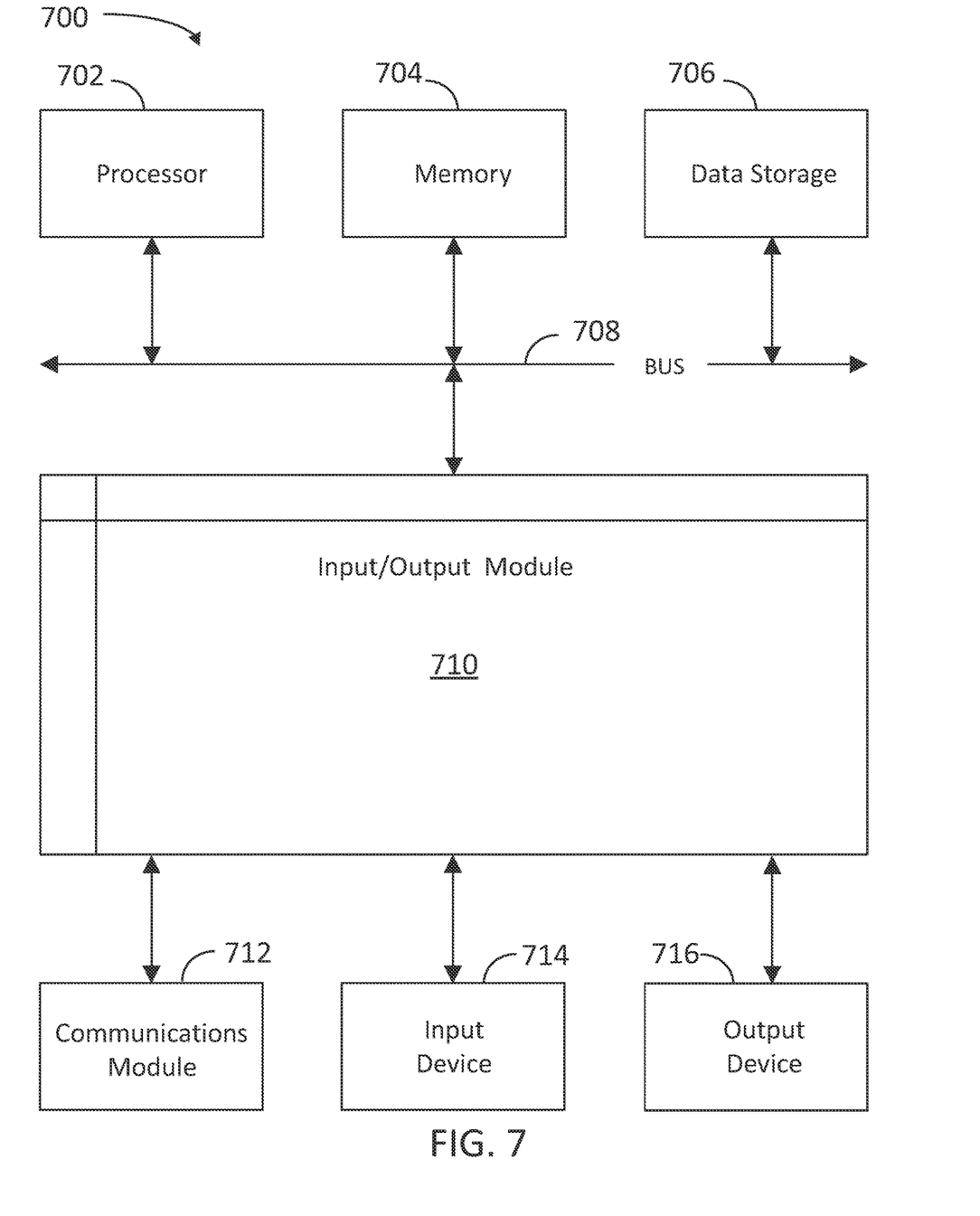
FIG. 7 is a block diagram illustrating an example computer system with which the client and network device of FIGS. 1-2 and the methods of FIGS. 5-6 can be implemented.

FIG. 7 is a block diagram illustrating an example computer system 700 with which the client and network device of FIGS. 1-2 and the methods of FIGS. 5-6 can be implemented. In certain aspects, the computer system 700 may be implemented using hardware or a combination of software and hardware, either in a dedicated network device, or integrated into another entity, or distributed across multiple entities. Computer system 700 (e.g., client device 110 and server 130) includes a bus 708 or other communication mechanism for communicating information, and a processor 702 (e.g., processors 212) coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704 (e.g., memories 220), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, e.g., one or more modules of computer program instructions encoded on a computer readable medium for execution by, or to control the operation of, the computer system 700, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage 706 such as a magnetic disk or optical disk, coupled to bus 708 for storing information and instructions. Computer system 700 may be coupled via input/output module 710 to various devices. Input/output module 710 can be any input/output module. Exemplary input/output modules 710 include data ports such as USB ports. The input/output module 710 is configured to connect to a communications module 712. Exemplary communications modules 712 (e.g., communications modules 218) include networking interface cards, such as Ethernet cards and modems. In certain aspects, input/output module 710 is configured to connect to a plurality of devices, such as an input device 714 (e.g., input device 214) and/or an output device 716 (e.g., output device 216). Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 716 include display devices, such as an LCD (liquid crystal display) monitor, for displaying information to the user.

According to one aspect of the present disclosure, the client device 110 and server 130 can be implemented using a computer system 700 in response to processor 702 executing one or more sequences of one or more instructions contained in memory 704. Such instructions may be read into memory 704 from another machine-readable medium, such as data storage 706. Execution of the sequences of instructions contained in main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data network device, or that includes a middleware component, e.g., an application network device, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and network devices. A client and network device are generally remote from each other and typically interact through a communication network. The relationship of client and network device arises by virtue of computer programs running on the respective computers and having a client-network device relationship to each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage 706. Volatile media include dynamic memory, such as memory 704. Transmission media include coaxial cables, copper wire, and fiber optics, including the wires forming bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
identifying, with a network controller, a client device in a network, and a first radio of a first network device in the network that is communicatively coupled with the client device;
determining a plurality of sequences of roaming events for a plurality of client devices in the network, wherein at least one sequence of roaming events associated with each client device in the plurality of client devices includes the first radio, wherein the plurality of client devices comprises the client device and at least one other client device;
evaluating a plurality of performance metrics for at least one roaming event in each of the plurality of sequences of the roaming events;
evaluating an interaction between the client device and a plurality of radios involved in the plurality of sequences of roaming events for the plurality of client devices;
determining a set of probabilities comprising a probability, for each of the plurality of radios, that the client device will be coupled to a respective radio of the plurality of radios, wherein the set of probabilities are based at least in part on (1) the plurality of sequences of roaming events, (2) the performance metrics, and (3) the interaction between the client device and the plurality of radios, wherein the plurality of sequences of roaming events comprises a sequence of roaming events associated with the at least one other client device;
selecting a second radio of a second network device which yields a highest quality of service from among the plurality of radios based on the set of probabilities; and
recommending switching from the first radio of the first network device to the second radio of the second network device to the client device.

2. The computer-implemented method of claim 1, wherein identifying a client device in a network comprises identifying a device type of the client device.

3. The computer-implemented method of claim 1 wherein selecting the second radio comprises identifying a compatibility of a manufacturer and a model of the client device with the second radio.

4. The computer-implemented method of claim 1, wherein selecting the second radio comprises predicting that the client device will move in a direction closer to the second radio.

5. The computer-implemented method of claim 1, wherein selecting a second radio of a second network device in the network comprises identifying a Wi-Fi environment in a vicinity of the client device and selecting the second radio based on the Wi-Fi environment.

6. The computer-implemented method of claim 1, wherein selecting the second radio in the network further comprises determining a bandwidth and a utilization rate of the second radio.

7. The computer-implemented method of claim 1, further comprising identifying an application running in the client device, and delaying or accelerating a steer of the client device from the first radio to the second radio based on the application running on the client device.

8. The computer-implemented method of claim 1, wherein recommending the second radio to the client device comprises identifying a time window to recommend the second radio to the client device.

9. The computer-implemented method of claim 1, further comprising storing a sequence including the first radio, the second radio, and a roaming event including a switch of the client device from the first radio to the second radio in a database.

10. The computer-implemented method of claim 1, further comprising identifying a similar configuration of a second client device in the network, and switching a communication channel of the second client device from a third radio to the second radio based on a roaming event including the first radio, the second radio, and the client device.

11. The computer-implemented method of claim 1, wherein the client device switches from the first radio of the first network device to the second radio of the second network device without scanning the one or more the plurality of radios in the network.

12. A network device, comprising:
a controller; and
a memory including computer code that when executed causes the controller to:
detect and identify a client device roaming in a network deployment;
detect and identify a current access point (AP) of the network deployment to which the client device is linked;
determine, for each of a plurality of other APs in the network deployment,
a plurality of sequences of roaming events of a plurality of client devices in the network deployment, wherein the plurality of client devices comprises the client device and at least one other client device, wherein at least one sequence of roaming events associated with each client device of the plurality of client devices includes the current AP, evaluating a plurality of performance metrics for at least one roaming event in the plurality of sequence of the roaming events, and evaluating an interaction between the client device and the plurality of other APs involved in the plurality of sequences of roaming events for the plurality of client devices;

determine, for each of the plurality of other APs in the network deployment, a set of probabilities that the client device will be coupled to each of the plurality of other APs in the network deployment based on (1) connectivity histories of the current AP and the plurality of other APs in the network deployment, (2) the plurality of sequences of roaming events, (3) the performance metrics, and (4) the interaction between the client device and the plurality of other APs, wherein the plurality of sequences of roaming events comprises a sequence of roaming events associated with the at least one other client device; and provide the set of probabilities as a sorted list to the client device, causing the client device to switch from the current AP to one of the plurality of other APs which yields a highest quality of service from among the plurality of other APs based on the set of probabilities to one of maintain or improve connectivity of the client device within the network deployment.

13. The network device of claim 12, wherein the sorted list further includes information regarding the plurality of radios operating in each of the plurality of other APs, wherein the causing of the client device to switch from the current AP to one of the plurality of other APs is based on selection, by the client device, of one of the plurality of radios that is desired for use in communicating within the network deployment.

14. The network device of claim 12, wherein the computer code, when executed, further causes the controller to determine whether a new AP installed in the network deployment should be added to the sorted list.

15. The network device of claim 14, wherein the determination whether the new AP installed in the network deployment should be added to the sorted list is based on a return signal strength indicator between the new AP and surrounding APs of the plurality of other APs.

16. The network device of claim 14, wherein the sorted list further includes information regarding whether to use a secure or public network for the network deployment.

17. The network device of claim 16, wherein the computer code, when executed, further causes the controller to detect a service set identifier authorizing the client device to use a secure network rather than a public network, and to re-sort the sorted list in accordance with those APs of the plurality of other APs having secure network credentials.

18. The network device of claim 12, wherein the network device comprises an AP acting as a virtual controller in the network deployment to provide the set of probabilities as a real-time recommendation to the client device.

19. A network device, comprising:
a controller; and
a memory including computer code that when executed causes the controller to:
detect and identify a client device roaming in a network deployment;
detect and identify a current access point (AP) of the network deployment to which the client device is linked;
determine, for each of a plurality of other APs in the network deployment, a plurality of sequences of roaming events of a plurality of client devices in the network deployment, wherein the plurality of client devices comprises the client device and at least one other client device, wherein at least one sequence of roaming events associated with each client device of the plurality of client devices includes the current AP,
evaluating a plurality of performance metrics for at least one roaming event in the plurality of sequence of the roaming events, and
evaluating an interaction between the client device and the plurality of other APs involved in the plurality of sequences of roaming events for the plurality of client devices;
determine, for each of the plurality of other APs in the network deployment, a set of probabilities that the client device will be coupled to each of the plurality of other APs in the network deployment based on (1) connectivity histories of the current AP and the plurality of other APs in the network deployment, (2) the plurality of sequences of roaming events, (3) the performance metrics, and (4) the interaction between the client device and the plurality of other APs, wherein the plurality of sequences of roaming events comprises a sequence of roaming events associated with the at least one other client device;
sort the set of probabilities;
adjust the set of probabilities in accordance with localization data provided to the controller by a tracking application operative of the client device as the client device is roaming in the network deployment, wherein the localization data comprises speed and direction of movement of the client device relative to one or more of the plurality of other APs; and
provide the adjusted set of probabilities as a sorted list to the client device, causing the client device to switch from the current AP to one of the plurality of other APs which yields a highest quality of service from among the plurality of other APs based on the adjusted set of probabilities to one of maintain or improve connectivity of the client device within the network deployment.

20. The network device of claim 19, wherein the localization data indicates a latest displacement of the client device prior to a current signal propagation configuration of the network deployment.

21. The network device of claim 19, wherein the localization data is additionally or alternatively provided to the controller by one or more of the plurality of APs to which the client device has recently linked as the client device is roaming in the network deployment.

* * * * *